United States Patent
Cecchi et al.

(10) Patent No.: US 11,120,590 B1
(45) Date of Patent: Sep. 14, 2021

(54) HIERARCHY DETECTION FOR BLOCK DIAGRAMS

(71) Applicant: Robert Bosch GmbH, Stuttgart (DE)

(72) Inventors: Fabio Cecchi, Menlo Park, CA (US); Naveen Ramakrishnan, Campbell, CA (US); Jochen Quante, Ludwigsburg (DE); Thomas Bleile, Stuttgart (DE); Jeffrey L. Irion, Pleasanton, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/860,909

(22) Filed: Apr. 28, 2020

(51) Int. Cl.
*G06T 11/20* (2006.01)
*G06F 8/34* (2018.01)

(52) U.S. Cl.
CPC .............. *G06T 11/206* (2013.01); *G06F 8/34* (2013.01); *G06T 2200/24* (2013.01)

(58) Field of Classification Search
CPC .................................................. G06T 11/206
See application file for complete search history.

(56) References Cited

U.S. PATENT DOCUMENTS

| | | | |
|---|---|---|---|
| 7,409,679 B2 | 8/2008 | Chedgey et al. | |
| 8,181,167 B2 | 5/2012 | Zhao | |
| 10,089,002 B2 | 10/2018 | Nugent | |
| 10,191,863 B2 | 1/2019 | Shearin et al. | |
| 2001/0033296 A1 | 10/2001 | Fullerton et al. | |
| 2006/0288311 A1* | 12/2006 | Heer | G06T 11/206 |
| | | | 715/853 |
| 2017/0090876 A1* | 3/2017 | Hale | G06F 16/2246 |
| 2017/0109933 A1 | 4/2017 | Voorhees et al. | |
| 2017/0200097 A1* | 7/2017 | Lau | G06T 11/206 |

\* cited by examiner

*Primary Examiner* — Charles Tseng
(74) *Attorney, Agent, or Firm* — Michael Best & Friedrich LLP

(57) ABSTRACT

Methods and systems for hierarchy detection for block diagrams. One system includes an electronic processor configured to access a block diagram. The electronic processor is also configured to identify a set of connected components in the block diagram. The electronic processor is also configured to convert a first connected component included in the set of connected components into a directed acyclic graph (DAG). The electronic processor is also configured to determine a set of candidate hierarchies included in the DAG. The electronic processor is also configured to verify the set of candidate hierarchies. The electronic processor is also configured to generate a displayable hierarchical block diagram based on the verified set of candidate hierarchies.

19 Claims, 10 Drawing Sheets

HIERARCHY DETECTION FOR BLOCK DIAGRAMS

FIELD

Embodiments relate to hierarchy detection, and more particularly, to automatically detecting hierarchies within a block diagram, such as a software block diagram.

SUMMARY

Software developers use block diagrams to create, visualize, and understand the underlying code of a software product or application. However, when a block diagram is complex and large in size, it becomes difficult to understand and work with. To facilitate navigation through complex, large block diagrams, nodes may be nested into hierarchies that may be collapsed or expanded as needed.

Currently, to ensure readability of the code and provide a clear documentation, software developers have to come up with a meaningful hierarchical grouping of the nodes present in the original (flat) block diagram. However, such an approach results in inaccuracies and inefficiencies. Additionally, a hierarchical block diagram may highly reflect the personal tastes of the developer. For example, a developer may prefer a less detailed block diagram while another developer may prefer a more detailed block diagram. Accordingly, hierarchical block diagrams turn out to be quite diverse in nature and, ultimately, may hinder the efficient and accurate understanding of the logic behind the code.

To solve these and other problems, the embodiments described herein provide, among other things, methods and systems for hierarchy detection to facilitate understanding of the underlying logic behind code. Embodiments described herein perform a structural analysis of an original (flat) block diagram to automatically detect one or more hierarchies and, ultimately, generate a hierarchical block diagram that facilitates the efficient and accurate understanding of the logic behind the code represented in the block diagram. In other words, embodiments described herein do not consider the roles that the node play in the code's logic.

For example, one embodiment provides a system for hierarchy detection for block diagrams. The system includes an electronic processor configured to access a block diagram. The electronic processor is also configured to identify a set of connected components in the block diagram. The electronic processor is also configured to convert a first connected component included in the set of connected components into a directed acyclic graph (DAG). The electronic processor is also configured to determine a set of candidate hierarchies included in the DAG. The electronic processor is also configured to verify the set of candidate hierarchies. The electronic processor is also configured to generate a displayable hierarchical block diagram based on the verified set of candidate hierarchies.

Another embodiment provides a method for hierarchy detection for block diagrams. The method includes accessing a block diagram. The method also includes identifying, with an electronic processor, a set of connected components in the block diagram. The method also includes converting, with the electronic processor, a first connected component included in the set of connected components into a directed acyclic graph (DAG). The method also includes determining, with the electronic processor, a set of candidate hierarchies included in the DAG. The method also includes verifying, with the electronic processor, the set of candidate hierarchies. The method also includes generating, with the electronic processor, a displayable hierarchical block diagram based on the verified set of candidate hierarchies.

Yet another embodiment provides a non-transitory, computer-readable medium storing instructions that, when executed by an electronic processor, perform a set of functions. The set of functions includes accessing a block diagram and identifying a set of connected components in the block diagram. The set of functions also includes converting a first connected component included in the set of connected components into a directed acyclic graph (DAG). The set of functions also includes determining a set of candidate hierarchies included in the DAG. The set of functions also includes verifying the set of candidate hierarchies. The set of functions also includes generating a displayable hierarchical block diagram for storage based on the verified set of candidate hierarchies.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. The Other embodiments are possible and embodiments described and/or illustrated here are capable of being practiced or of being carried out in various ways.

It should also be noted that a plurality of hardware and software-based devices, as well as a plurality of different structural components may be used to implement the invention. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
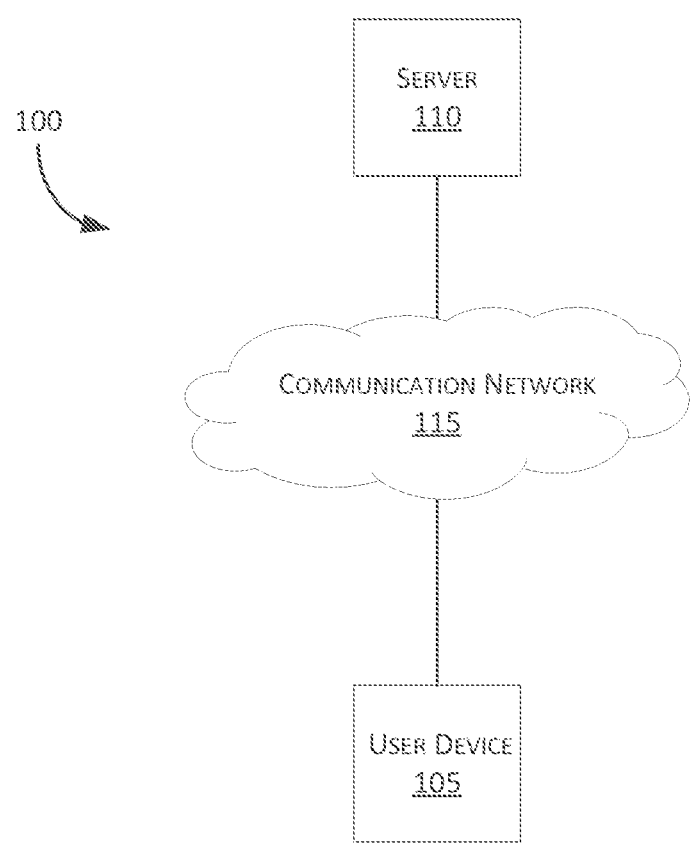
FIG. 1 schematically illustrates a system for hierarchy detection according to some embodiments.

FIG. 1 illustrates a system 100 for hierarchy detection according to some embodiments. In the illustrated example, the system 100 includes a user device 105 and a server 110. In some embodiments, the system 100 includes fewer, additional, or different components than illustrated in FIG. 1. For example, the system 100 may include multiple user devices 105, multiple servers 110, or a combination thereof.

The user device 105 and the server 110 communicate over one or more wired or wireless communication networks 115. Portions of the communication networks 115 may be implemented using a wide area network, such as the Internet, a local area network, such as a Bluetooth™ network or Wi-Fi, and combinations or derivatives thereof. Alternatively or in addition, in some embodiments, components of the system 100 communicate directly as compared to through the communication network 115. Also, in some embodiments, the components of the system 100 communicate through one or more intermediary devices not illustrated in FIG. 1.

Figure 2:
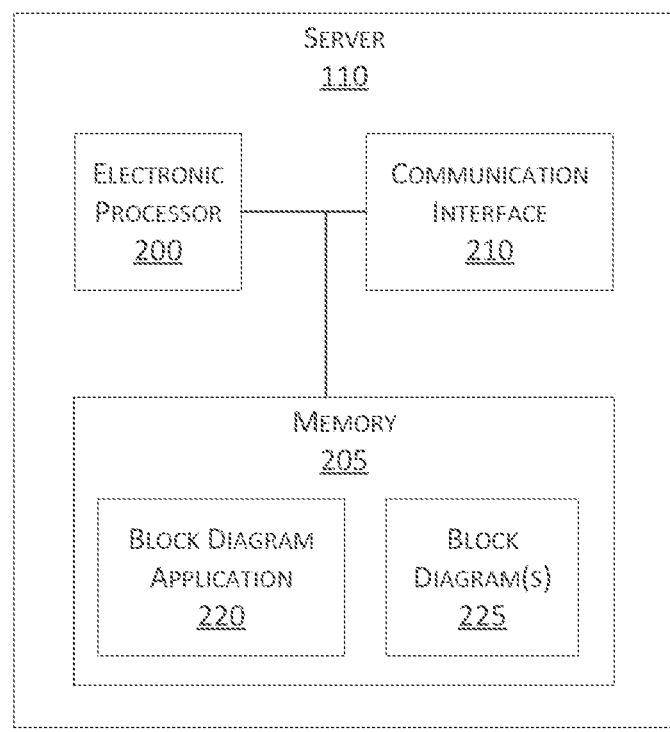
FIG. 2 schematically illustrates a server included in the system of FIG. 1 according to some embodiments.

The server 110 includes a computing device, such as a server, a database, or the like. As illustrated in FIG. 2, the server 110 includes an electronic processor 200, a memory 205, and a communication interface 210. The electronic processor 200, the memory 205, and the communication interface 210 communicate wirelessly, over one or more communication lines or buses, or a combination thereof. The server 110 may include additional components than those illustrated in FIG. 2 in various configurations. For example, the server 110 may also include one or more human machine interfaces, such as a keyboard, keypad, mouse, joystick, touchscreen, display device, printer, speaker, and the like, that receive input from a user, provide output to a user, or a combination thereof. The server 110 may also perform additional functionality other than the functionality described herein. Also, the functionality described herein as being performed by the server 110 may be distributed among multiple servers or devices (for example, as part of a cloud service or cloud-computing environment).

The communication interface 210 may include a transceiver that communicates with the user device 25 over the communication network 115 and, optionally, one or more other communication networks or connections. The electronic processor 200 includes a microprocessor, an application-specific integrated circuit (ASIC), or another suitable electronic device for processing data, and the memory 205 includes a non-transitory, computer-readable storage medium. The electronic processor 200 is configured to retrieve instructions and data from the memory 205 and execute the instructions. As illustrated in FIG. 2, the memory 205 includes a block diagram application 220. The block diagram application 220 is a software application executable by the electronic processor 200. As described in more detail below, the electronic processor 200 executes the block diagram application 220 to generate and access block diagrams 225 (also stored in the memory 205) that visually represent a software product, a software application, or a code file. For example, in some embodiments, the block diagram application 220 accesses a block diagram 225 to automatically detect one or more hierarchies of the block diagram 225 and generate hierarchical block diagram based on the detected one or more hierarchies.

The user device 105 also includes a computing device, such as a desktop computer, a laptop computer, a tablet computer, a terminal, a smart telephone, a smart television, a smart wearable, or another suitable computing device that interfaces with a user. The user device 105 may be used by an end user to develop a software product, generate a block diagram 225 for the software product, or a combination thereof. The user device 105 may transmit the block diagram 225 to the server 110 for hierarchy detection. Although not illustrated in FIG. 1, the user device 105 may include similar components as the server 110, such as electronic processor (for example, a microprocessor, an application-specific integrated circuit (ASIC), or another suitable electronic device), a memory (for example, a non-transitory, computer-readable storage medium), a communication interface, such as a transceiver, for communicating over the communication network 115 and, optionally, one or more additional communication networks or connections, and one or more human machine interfaces. For example, to communicate with the server 110, the user device 105 may store a browser application or a dedicated software application executable by an electronic processor. The system 100 is described herein as providing a hierarchy detection service through the server 110. However, in other embodiments, the functionality described herein as being performed by the server 110 may be locally performed by the user device 115. For example, in some embodiments, the user device 105 may store the block diagram application 220.

Figure 3:
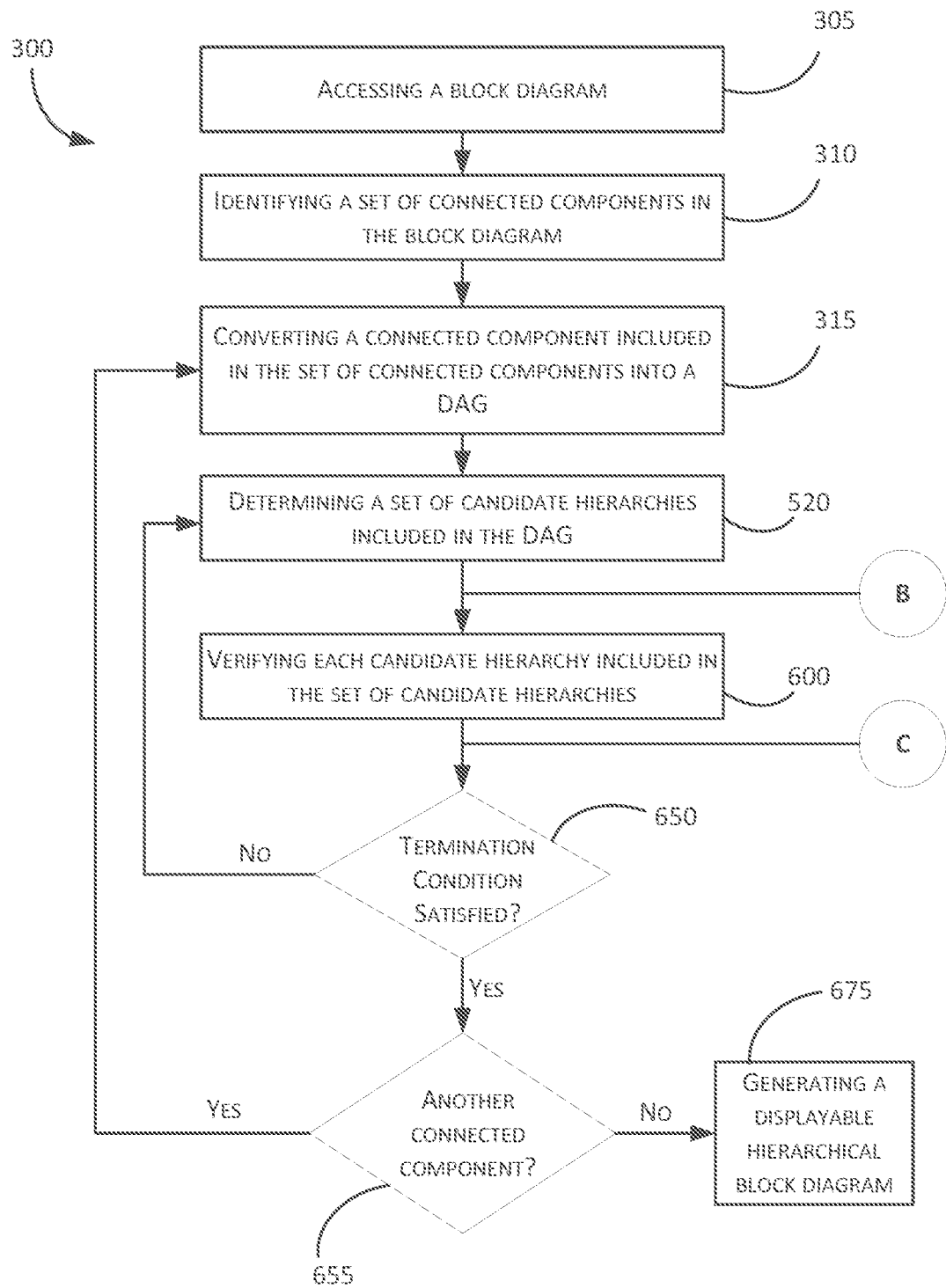
FIG. 3 is a flowchart illustrating a method for hierarchy detection performed by the system of FIG. 1 in accordance with some embodiments.

FIG. 3 is a flowchart illustrating a method 300 for hierarchy detection performed by the system 100 according to some embodiments. The method 300 is described as being performed by the server 110 and, in particular, the block diagram application 220 as executed by the electronic processor 200. However, as noted above, the functionality described with respect to the method 300 may be performed by other devices, such as the user device 105, or distributed among a plurality of devices, such as a plurality of servers included in a cloud service.

As illustrated in FIG. 3, the method 300 includes accessing, with the electronic processor 200, a block diagram 255 (at block 305). As illustrated in FIG. 1, the block diagrams 225 may be stored in the memory 205 of the server 110. However, in other embodiments, the block diagrams 225 (or a set or portion thereof) may be stored on a memory external to the server 110, such as a memory of the user device 105 or an external storage device. In such embodiments, the server 100 receives the block diagram 255 from the user device 105 or the external storage device via the communication network 115.

The electronic processor 200 identifies a set of connected components included in the block diagram 255 (at block 310). A connected component refers to a node grouping (or graph) where the nodes included in that node grouping interact with (are connected via edges) but are isolated from (have no or limited interaction with) other node groupings of the block diagram 255. The electronic processor 200 may identify a set of connected components by analyzing the structure of the block diagram 255. Accordingly, in some embodiments, the electronic processor 200 identifies the set of connected components based solely on a structure (or structural analysis) of the block diagram 225 without considering the underlying logic or functionality associated with the set of connected components (or a portion or portions thereof). The set of connected components may include one or more connected components (for example, a first connected component, a second connected component, and the like. Each connected component isolated from one another and analyzed or considered separately from each other.

After identifying the set of connected components (at block 310), the electronic processor 200 converts each connected component included in the set of connected components into a DAG (at block 315). A DAG is an acyclic graph having a direction as well as a lack of cycles. In other words, data visually flows in a single direction through the DAG, such as from left to right. In some embodiments, the electronic processor 200 converts each connected component included in the set of connected components into a DAG using the method 500 illustrated in FIG. 4.

Figure 4:
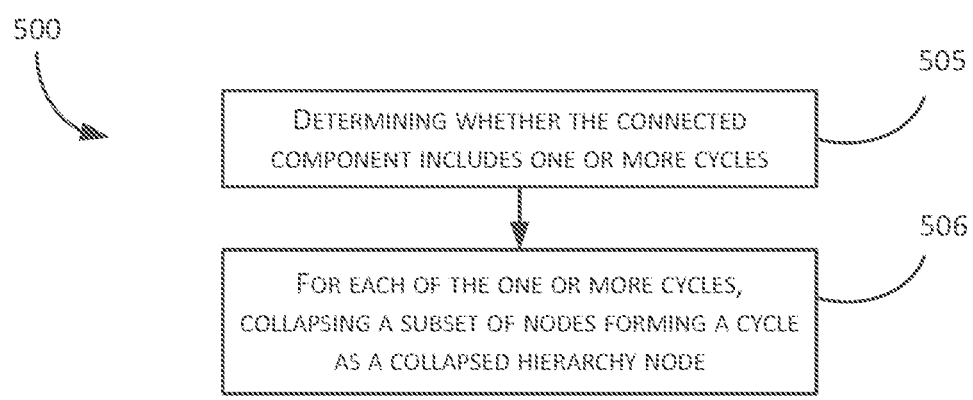
FIG. 4 is a flowchart illustrating a method for converting a connected component included in the a set of connected components of a block diagram into a directed acyclic graph as part of the method of FIG. 3 in accordance with some embodiments.

FIG. 4 is a flowchart illustrating a method 500 for converting a connected component into a DAG in accordance with some embodiments. As seen in FIG. 5, the electronic processor 200 determines whether the connected component includes a cycle (at block 505). A cycle includes a subset of nodes (for example, two or more nodes) where data flows in two different directions, such as from left to right and from right to left, between the two or more nodes. In other words, a subset of nodes forms a cycle when there is bi-directional data flow between the nodes within the subset of nodes. When the connected component includes a cycle, the electronic processor 200 collapses the subset of nodes forming the cycle as a collapsed hierarchy node (at block 506). A collapsed hierarchy node has the same connecting edges as the subset of nodes included in the collapsed hierarchy node. In other words, the edges connecting the nodes within the cycle disappear and the edges connecting the cycle to the rest of the block diagram 225 remain. By collapsing the subset of nodes as a collapsed hierarchy node, the cycle formed by the subset of nodes is removed, which, ultimately, converts the connected component into a DAG.

In some embodiments, the connected component includes multiple cycles (for example, a first cycle, a second cycle, and the like). In such embodiments, the electronic processor 200 collapses each subset of nodes forming a cycle as collapsed hierarchy nodes such that the connected component as a whole becomes a DAG. For example, when a connected component includes a first subset of nodes forming a first cycle and a second subset of nodes forming a second cycle different from the first cycle, the electronic processor 200 collapses the first subset of nodes as a first collapsed hierarchy node and collapses the second subset of nodes as a second collapsed hierarchy node to convert the connected component into a DAG.

Figure 5A:
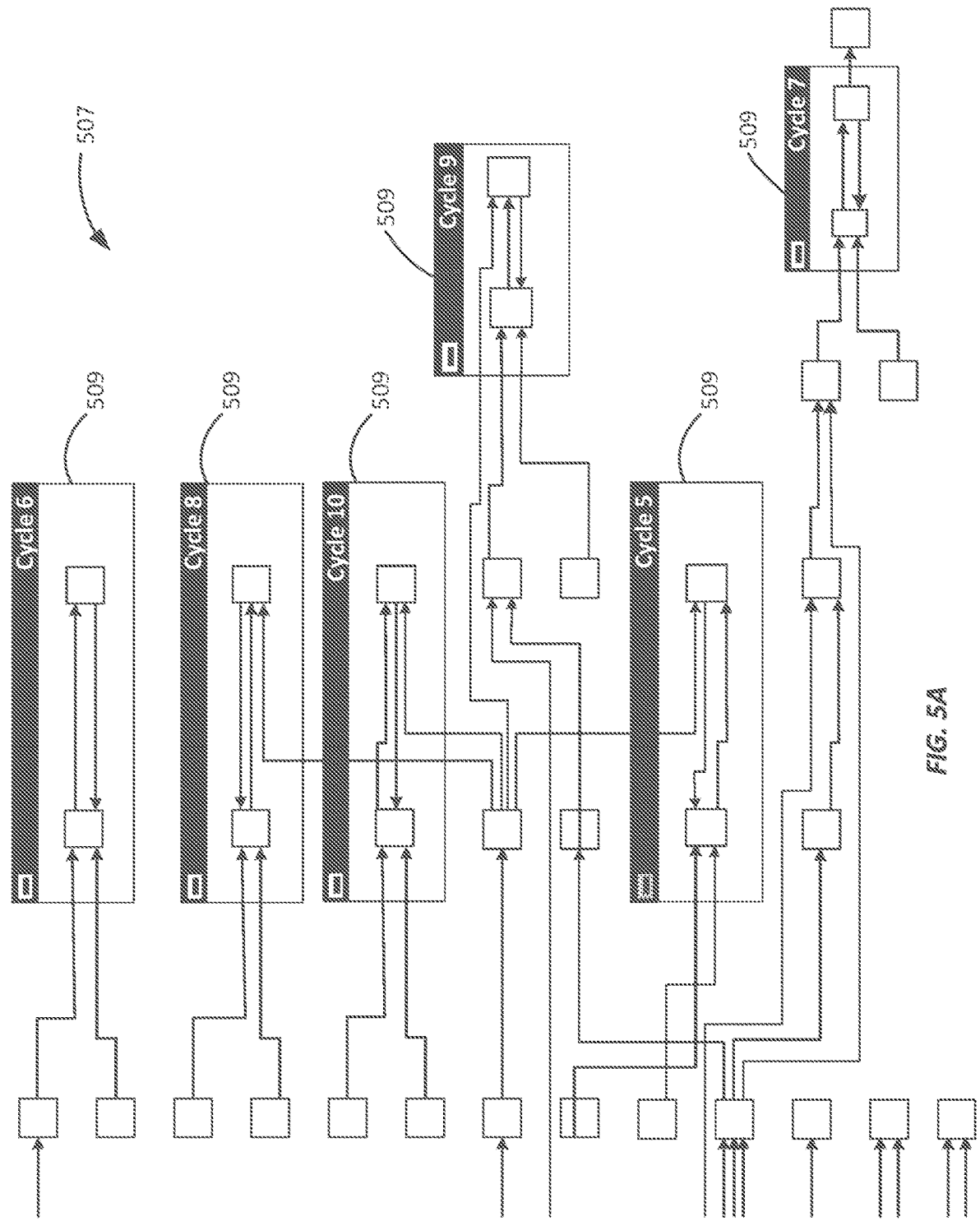
FIGS. 5A-5B illustrate an example connected component of a block diagram according to some embodiments.
Figure 5B:
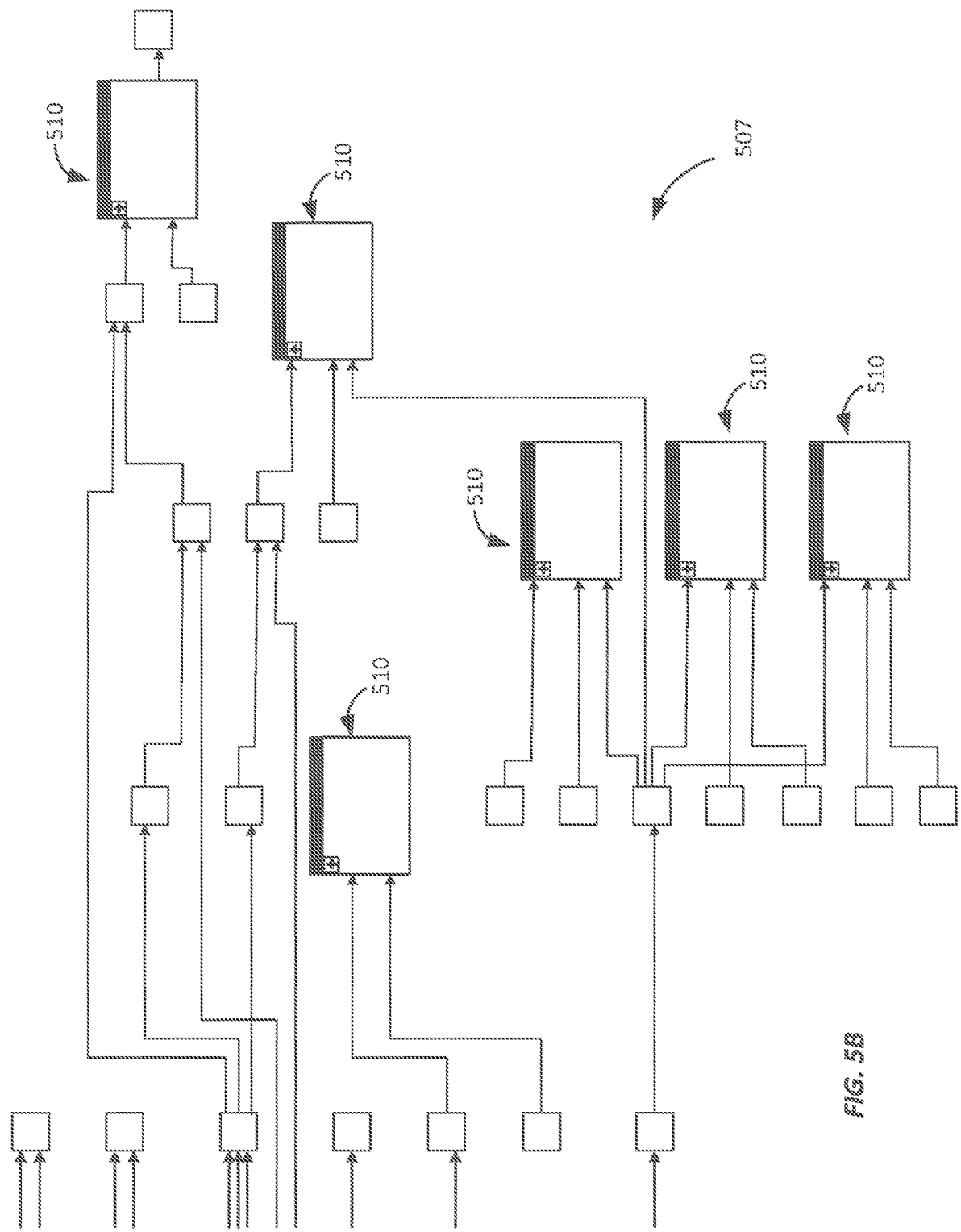

As one example, FIG. 5A illustrates an example connected component 507. As seen in FIG. 5A, the connected component 507 includes multiple cycles 509. The electronic processor 200 converts the connected component 507 into a DAG by collapsing each of the cycles 509 as collapsed hierarchy nodes 510, as seen in FIG. 5B. As seen in FIG. 5B, the connected component 507 no longer includes any cycles 509 and data visually flows in a single direction. Accordingly, the connected component 507 illustrated in FIG. 5B is a DAG.

Figure 6:
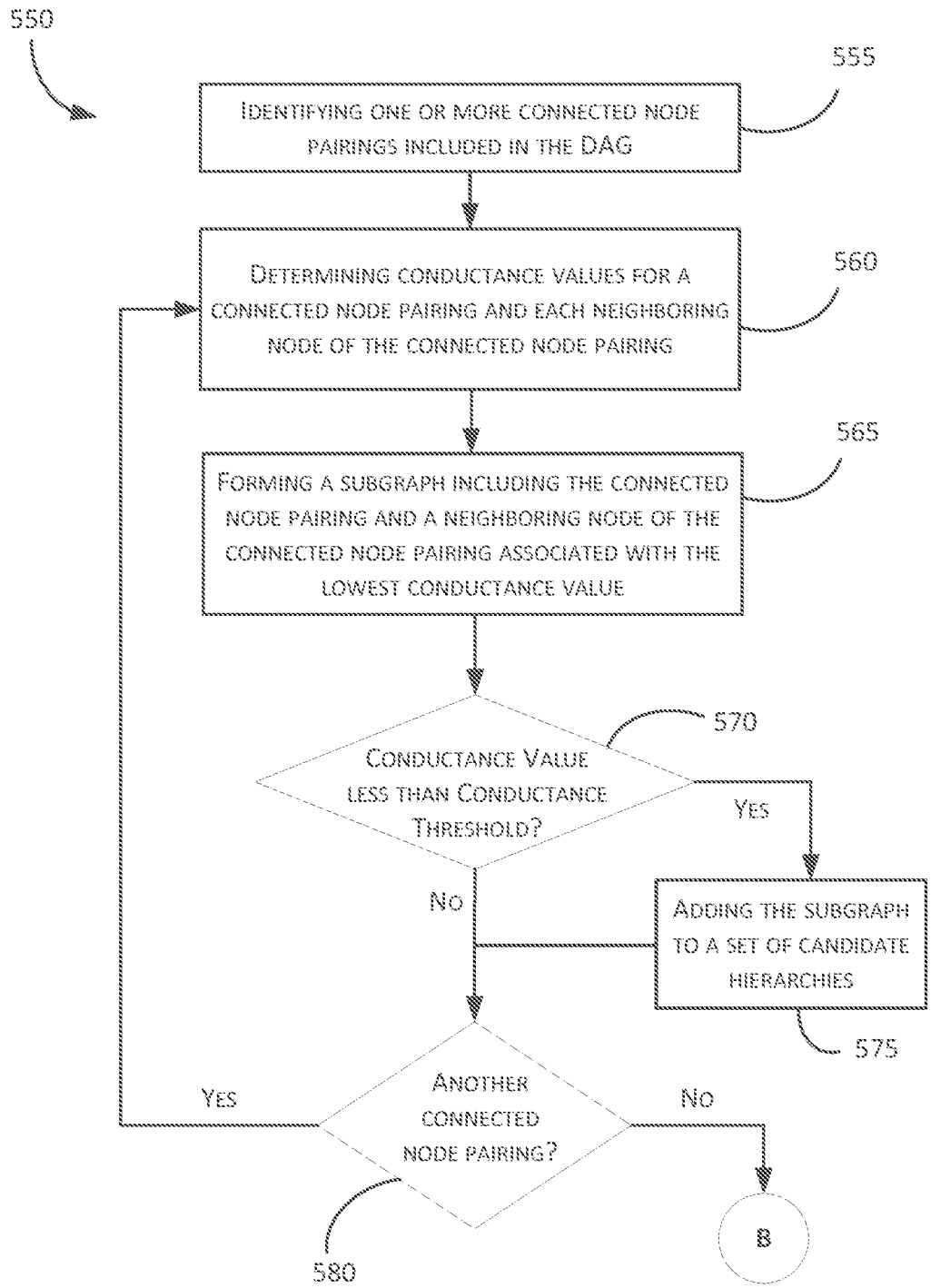
FIG. 6 is a flowchart illustrating a method for determining a set of candidate hierarchies as part of the method of FIG. 3 in accordance with some embodiments.

After converting each connected component included in the set of connected components into a DAG (at block 315), the electronic processor 200 determines a set of candidate hierarchies included in the DAG (at block 520). A candidate hierarchy refers to a node grouping that is a candidate to become a hierarchy after being verified (as described in greater detail below). In some embodiments, the electronic processor 200 determines a set of candidate hierarchies included in the DAG using the method 505 illustrated in FIG. 6. FIG. 6 is a flowchart illustrating a method 550 for identifying a set of candidate hierarchies included in a DAG in accordance with some embodiments.

As seen in FIG. 6, the electronic processor 200 identifies one or more connected node pairings included in the DAG (at block 555). A connected node pairing includes two or more nodes connected by one or more connecting edges. For each of the one or more connected node pairings, the electronic processor 200 determines conductance values for a connected node pairing and each neighboring node of the connected node pairing (at block 560). Conductance (i.e., a conductance value) represents a ratio of connecting edges within a connected node pairing (inner edges) and connecting edges outside of the connected node pairing (outer edges).

After determining the conductance values for the connected node pairing and each neighboring node of the connected node pairing (at block 560), the electronic processor 200 forms a subgraph including the connected node pairing and a neighboring node of the connected node pairing with the lowest conductance (at block 565). As one example, a connected node pairing may include Node A and Node B. Node A and Node B may have two neighboring nodes, Node N1 and Node N2. The electronic processor 200 may group Node A, Node B, and Node N1 as a first potential subgraph. Similarly, the electronic processor 200 may group Node A, Node B, and Node N2 as a second potential subgraph. The electronic processor 200 then determines a first conductance value associated with the first potential subgraph and a second conductance value associated with the second potential subgraph. After determining conductance values for each potential subgraph, the electronic processor 200 determines which potential subgraph is associated with the lowest conductance and forms the subgraph such that the subgraph includes the potential subgraph associated with the lowest conductance. For example, when the second conductance value is the lowest conductance, the electronic processor 200 forms the subgraph including Node A, Node B, and Node N2.

The electronic processor 200 then compares a conductance value for the subgraph with a conductance threshold (at block 570). The conductance threshold is adjustable by, for example, an end user. Adjusting the conductance threshold ultimately adjusts the number of candidate hierarchies detected. For example, a stricter conductance threshold (a lower conductance threshold) may result in a smaller number of candidate hierarchies detected while a less strict conductance threshold (a higher conductance threshold) may result in a larger number of candidate hierarchies detected. In some embodiments, the user device 105 receives user input adjusting or setting the conductance threshold. The user device 105 may transmit a conductance threshold setting associated with the user input to the server 110 for storage in, for example, the memory 205. The electronic processor 200 may access the conductance threshold setting (for example, as part of block 570).

When the conductance value for the subgraph is less than (or satisfies) the conductance threshold (Yes at block 570), the electronic processor 200 identifies the subgraph has a candidate hierarchy and adds the subgraph to a set of candidate hierarchies (at block 575). When the conductance value for the subgraph is not less than (or does not satisfy) the conductance threshold (No at block 570), the electronic processor 200 does not identify the subgraph as a candidate hierarchy.

As noted above, in some embodiments, the electronic processor 200 identifies multiple connected node pairings (for example, a first connected node pairing, a second connected node pairing, and the like). Accordingly, in such embodiments, the electronic processor determines whether another connected node pairing was identified in the DAG (at block 580). When the electronic processor 200 determines that another connected node pairing was identified for the DAG (Yes at block 580), the electronic processor 200 may return to block 560 and repeat the illustrated process for one or more connected node pairing identified in block 555. In some embodiments, the electronic processor 200 repeats blocks 560-580 until the electronic processor 200 determines that there is not another connected node pairing (No at block 580). In other words, the electronic processor 200 may repeat blocks 560-580 for each connected node pairing identified in the DAG.

Figure 7:
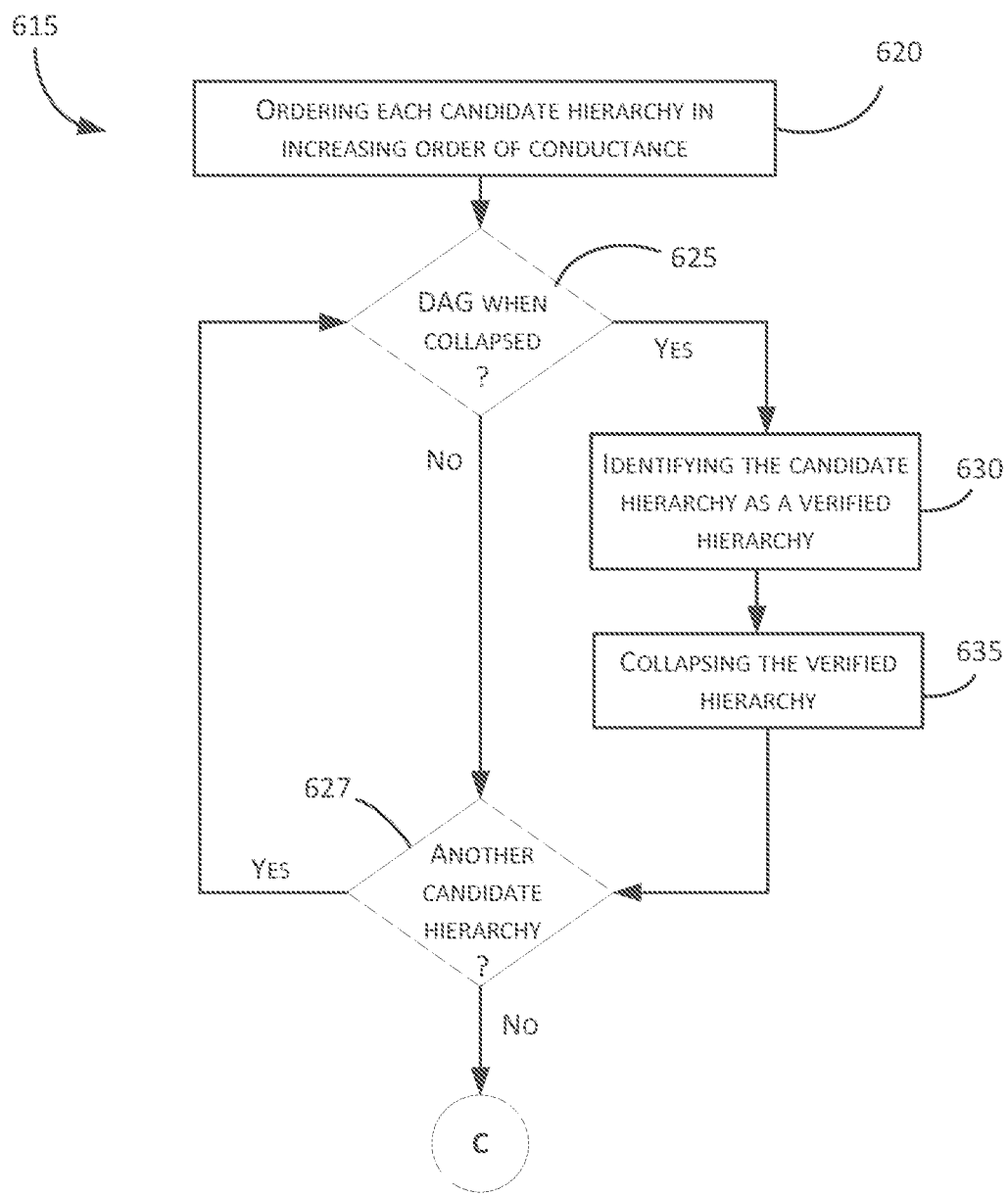
FIG. 7 is a flowchart illustrating a method for verifying a set of candidate hierarchies as part of the method of FIG. 3 in accordance with some embodiments.

When the electronic processor 200 determines that there is not another connected node pairing (No at block 580), the electronic processor 200 verifies each candidate hierarchy included in the set of candidate hierarchies (at block 600 of FIG. 3). In some embodiments, the electronic processor 200 verifies each candidate hierarchy using the method 615 illustrated in FIG. 7. FIG. 7 is a flowchart illustrating a method 615 for verifying each candidate hierarchy included in the set of candidate hierarchies in accordance with some embodiments.

As seen in FIG. 7, the electronic processor 200 may order each candidate hierarchy included in the set of candidate hierarchies in increasing order of conductance (at block 620). The electronic processor 200 may sequentially determine whether collapsing each candidate hierarchy individually yields a DAG (a subsequent or additional DAG) (at block 625). When collapsing the candidate hierarchy does not result in a DAG (No at block 625), the method 615 proceeds to block 627. When collapsing the candidate hierarchy results in a DAG (Yes at block 625), the electronic processor 200 identifies the candidate hierarchy as a verified hierarchy (at block 630) and collapses the verified hierarchy (at block 635). After verifying the candidate hierarchy (at blocks 630 and 635), the method 615 proceeds to block 627. At block 627, the electronic processor 200 determines whether the set of candidate hierarchy includes another candidate hierarchy. When the set of candidate hierarchies includes another candidate hierarchy (Yes at block 627), the method 615 returns to block 625 and the electronic processor 200 may repeat blocks 625-635 for the next candidate hierarchy of the ordered set of candidate hierarchies (i.e., a second candidate hierarchy having the second lowest conductance of the ordered set of candidate hierarchies). In some embodiments, the electronic processor 200 repeats blocks 625-635 until the electronic processor 200 determines that the set of candidate hierarchies does not include another candidate hierarchy (No at block 627). In other words, the electronic processor 200 may repeat blocks 625-635 for each candidate hierarchy included in the ordered set of candidate hierarchies.

After verifying each candidate hierarchy included in the set of candidate hierarchies (at block 600), the electronic processor 200 determines whether a termination condition is satisfied (at block 650). The termination condition may specify how many levels of nested hierarchies are detected or explored for a given connected component. A user may adjust or set the termination condition using the user device 105 (as similarly described above with respect to the conductance threshold). When the electronic processor 200 determines that the termination condition is not satisfied (No at block 650), the electronic processor 200 returns to block 520 of the method 300 and repeats blocks 520 and 600. When the electronic processor 200 determines that the termination condition is satisfied (Yes at block 650), the electronic processor 200 proceeds to block 655 of the method 300.

At block 655, the electronic processor 200 determines whether the block diagram 255 includes one or more additional connected component. As noted above, in some embodiments, the block diagram 255 includes multiple connected component. When the electronic processor 200 determines that the block diagram 255 includes another connected component (for example, a second connected component, a third connected component, and the like) (Yes at block 655), the method 300 returns to block 315 and the electronic processor 200 may repeat blocks 315, 520, 600, and 650 with respect to one or more of the additional connected component. In some embodiments, the electronic processor 200 repeats blocks 315, 520, 600, and 650 until the electronic processor 200 determines that the block diagram 255 does not include another connected component (No at block 655). In other words, the electronic processor 200 may repeat blocks 315, 520, 600, and 650 for each connected component included in the set of connected components identified in the block diagram 255.

When the electronic processor 200 determines that the block diagram 255 does not include another connected component (No at block 655), the electronic processor 200 generates a displayable hierarchical block diagram based on the verified set of candidate hierarchies (at block 675). In some embodiments, the electronic processor 200 transmits the displayable hierarchical block diagram to the user device 105 for storage in a memory of the user device 105, display on a display device of the user device 105, or a combination thereof. Alternatively or in addition, the electronic processor 200 may transmit the displayable hierarchical block diagram to another external storage device accessible by the user device 105, the server 110, or a combination thereof. In some embodiments, the displayable hierarchical block diagram is stored in the memory 205 of the server 110. In such embodiments, the server 110 enables access to the displayable hierarchical block diagram by, for example, the user device 105.

Figure 8A:
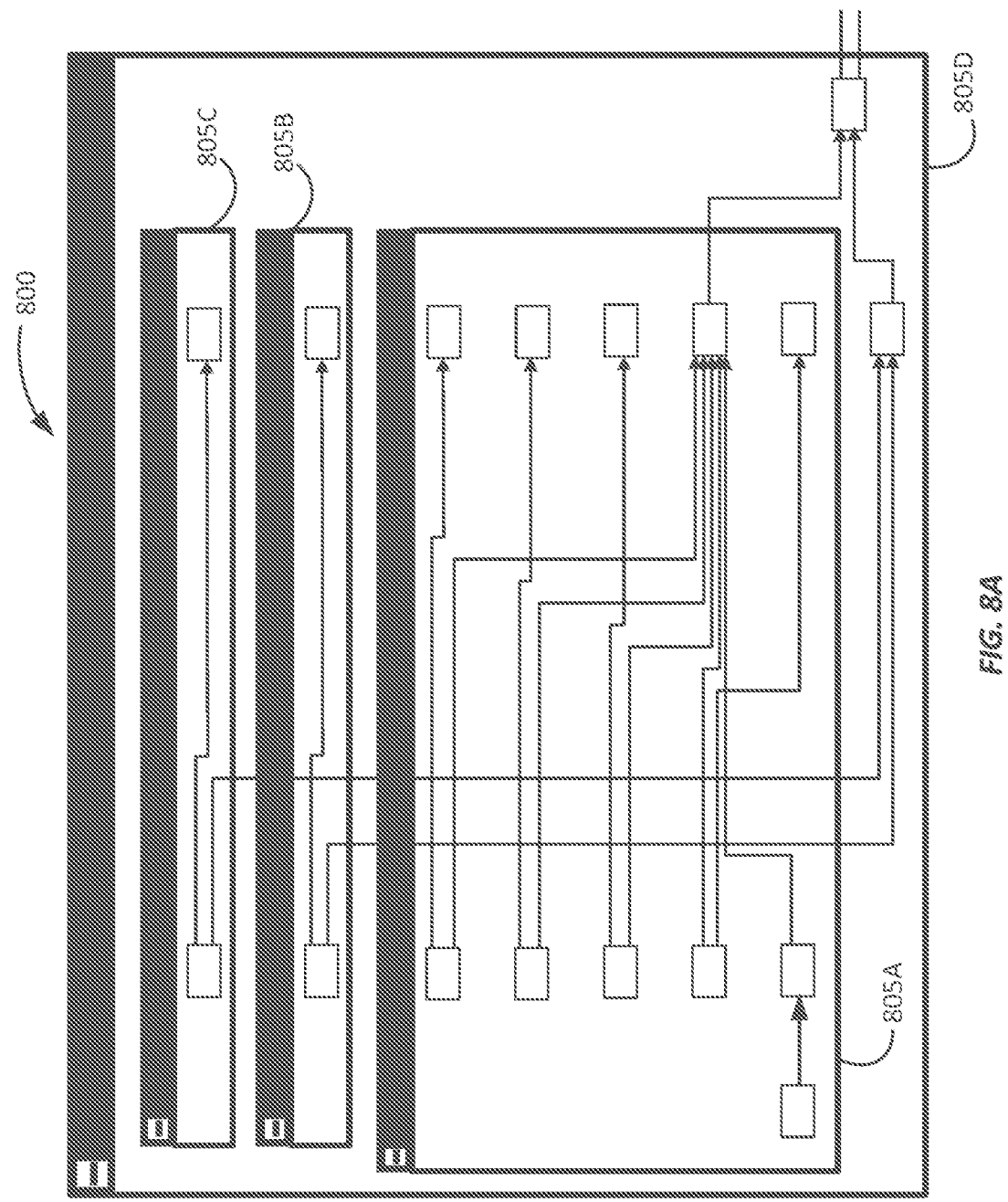
FIGS. 8A-8B illustrate an example portion of a displayable hierarchical block diagram having four verified hierarchies according to some embodiments.
Figure 8B:
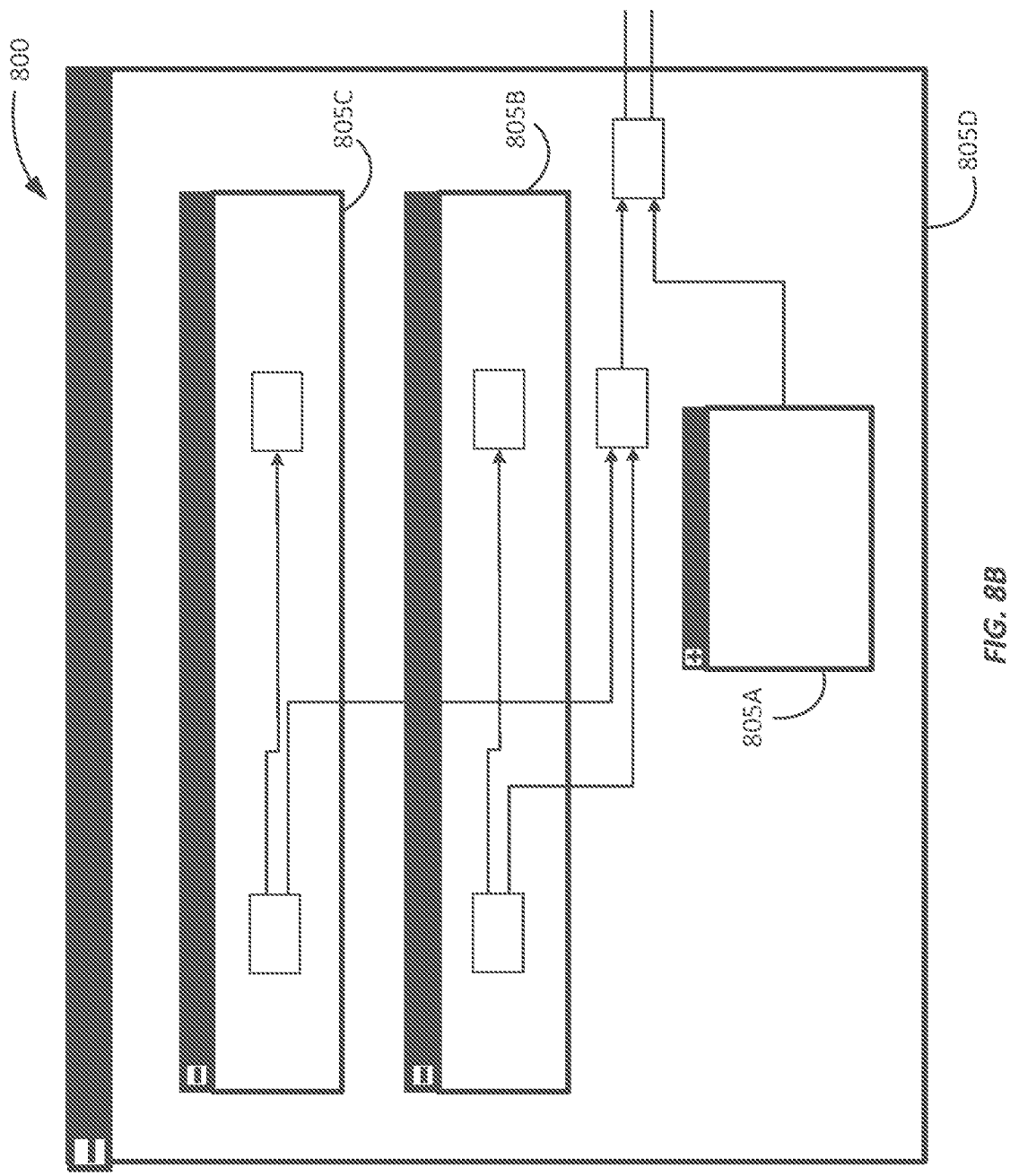

As one example, FIGS. 8A-8B illustrates a portion 800 of a displayable hierarchical block diagram. In the illustrated example, the portion 800 includes four verified hierarchies (a first hierarchy 805A, a second hierarchy 805B, a third hierarchy 805C, and a fourth hierarchy 805D) that are collapsible and expandable. For example, FIG. 8A illustrates the first hierarchy 805A expanded and FIG. 8B illustrates the first hierarchy 805A collapsed. As also seen in FIGS. 8A-8B, one or more of the hierarchies 805A-805D may be nested. For example, the first hierarchy 805A is nested within the fourth hierarchy 805D.

Thus, the embodiments provide, among other things, methods and systems for hierarchy detection for block diagrams. Various features and advantages of certain embodiments are set forth in the following claims.

What is claimed is:

1. A system for hierarchy detection for block diagrams, the system comprising:
an electronic processor and a memory storing instructions for execution by the electronic processor configured to access an input block diagram,
identify a set of connected components in the block diagram,
convert a first connected component included in the set of connected components into a directed acyclic graph (DAG),
determine an initial set of candidate hierarchies included in the DAG, wherein the initial set of candidate hierarchies is determined based on conductance values for connected node pairings included in the DAG and each neighboring node of each connected node pairing,
verify the initial set of candidate hierarchies, and
generate a displayable hierarchical block diagram based on the verified set of candidate hierarchies.

2. The system of claim 1, wherein the electronic processor is configured to convert the first connected component included in the set of connected components into the DAG by
determining whether the first connected component includes a cycle, and
in response to the first connected component including the cycle, collapsing a subset of nodes forming the cycle as collapsed hierarchy nodes.

3. The system of claim 2, wherein the collapsed hierarchy nodes includes a same set of connecting edges as the subset of nodes forming the cycle.

4. The system of claim 1, wherein the electronic processor is configured to determine the initial set of candidate hierarchies by
identifying a first connected node pairing included in the DAG,
determining a plurality of conductance values for the first connected node pairing and each neighboring node of the first connected node pairing,
forming a subgraph including the first connected node pairing and a neighboring node of the first connected node pairing with a lowest conductance value, and
in response to a conductance value for the subgraph being less than a conductance threshold, adding the subgraph to the initial set of candidate hierarchies as a candidate hierarchy.

5. The system of claim 1, wherein the electronic processor is configured to verify a candidate hierarchy included in the initial set of candidate hierarchies by
determining whether collapsing the candidate hierarchy results in a subsequent DAG,
in response to a collapse of the candidate hierarchy resulting in the subsequent DAG,
identify the candidate hierarchy as a verified hierarchy, and
collapse the verified hierarchy.

6. The system of claim 1, wherein the electronic processor is further configured to determine whether a termination condition is satisfied prior to generating the displayable hierarchical block diagram.

7. The system of claim 1, wherein the electronic processor is further configured to determine whether the input block diagram includes a second connected component.

8. The system of claim 7, wherein the electronic processor is configured to
in response to determining that the input block diagram includes the second connected component,
convert the second connected component into a second DAG,
determine a second set of candidate hierarchies included in the second DAG, and
verify the second set of candidate hierarchies.

9. The system of claim 8, wherein the displayable hierarchical block diagram is also based on the verified second set of candidate hierarchies.

10. A method for hierarchy detection for block diagrams, the method comprising:
accessing a block diagram;
identifying, with an electronic processor, a set of connected components in the block diagram;
converting, with the electronic processor, a first connected component included in the set of connected components into a directed acyclic graph (DAG);
determining, with the electronic processor, an initial set of candidate hierarchies included in the DAG, wherein the initial set of candidate hierarchies is determined based on conductance values for connected node pairings included in the DAG and each neighboring node of each connected node pairing;
verifying, with the electronic processor, the initial set of candidate hierarchies; and
generating, with the electronic processor, a displayable hierarchical block diagram based on the verified set of candidate hierarchies.

11. The method of claim 10, wherein converting the first connected component into a DAG includes
determining whether the first connected component includes one or more cycles, wherein each of the one or more cycles is formed by a subset of nodes; and
in response to determining that the first connected component includes the one or more cycles, collapsing each subset of nodes forming each of the one or more cycles.

12. The method of claim 10, wherein determining the initial set of candidate hierarchies includes
identifying a first connected node pairing included in the DAG,
determining a plurality of conductance values for the first connected node pairing and each neighboring node of the first connected node pairing,
forming a subgraph including the first connected node pairing and a neighboring node of the first connected node pairing with a lowest conductance value, and
in response to a conductance value for the subgraph being less than a conductance threshold, adding the subgraph to the initial set of candidate hierarchies as a candidate hierarchy.

13. The method of claim 10, wherein verifying the initial set of candidate hierarchies includes
determining whether collapsing a candidate hierarchy included in the initial set of candidate hierarchies results in a subsequent DAG,
in response to the collapse of the candidate hierarchy resulting in the subsequent DAG,
identifying the candidate hierarchy as a verified hierarchy, and
collapsing the verified hierarchy.

14. The method of claim 10, further comprising:
determining whether a termination condition is satisfied prior to generating the displayable hierarchical block diagram.

15. The method of claim 10, further comprising:
determining whether the set of connected components includes a second connected component.

16. The method of claim 15, further comprising:
in response to determining that the set of connected components includes the second connected component,
converting the second connected component into a second DAG,
determining a second set of candidate hierarchies included in the second DAG, and
verifying the second set of candidate hierarchies.

17. The method of claim 16, wherein generating the displayable hierarchical block diagram includes generating the displayable hierarchical block diagram also based on the verified second set of candidate hierarchies.

18. A non-transitory, computer-readable medium storing instructions that, when executed by an electronic processor, perform a set of functions, the set of functions comprising:
accessing a block diagram;
identifying a set of connected components in the block diagram;
converting a first connected component included in the set of connected components into a directed acyclic graph (DAG);
determining an initial set of candidate hierarchies included in the DAG by
identifying a connected node pairing included in the DAG,
determining a plurality of conductance values for the connected node pairing and each neighboring node of the connected node pairing,
forming a subgraph including the connected node pairing and a neighboring node of the connected node pairing with a lowest conductance value, and
in response to a conductance value for the subgraph being less than a conductance threshold, adding the subgraph to the initial set of candidate hierarchies as a candidate hierarchy;
verifying the initial set of candidate hierarchies; and
generating a displayable hierarchical block diagram based on the verified set of candidate hierarchies.

19. The non-transitory computer-readable medium of claim 18, wherein converting the first connected component into a DAG includes
determining whether the first connected component includes one or more cycles, wherein each of the one or more cycles is formed by a subset of nodes; and
in response to determining that the first connected component includes the one or more cycles, collapsing each subset of nodes forming each of the one or more cycles.

* * * * *